United States Patent
Shivappa et al.

(10) Patent No.: US 12,004,917 B1
(45) Date of Patent: Jun. 11, 2024

(54) MANDIBULAR QUADRIDAM

(71) Applicant: KING FAISAL UNIVERSITY, Al-Ahsa (SA)

(72) Inventors: Anil Bangalore Shivappa, Al-Ahsa (SA); Guna Shekar Madiraju, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/141,998

(22) Filed: May 1, 2023

(51) Int. Cl.
 *A61C 5/82* (2017.01)

(52) U.S. Cl.
 CPC ..................................... *A61C 5/82* (2017.02)

(58) Field of Classification Search
 CPC ............ A61C 5/82; A61C 17/06; A61C 17/10
 See application file for complete search history.

(56) References Cited

U.S. PATENT DOCUMENTS

| | | | | |
|---|---|---|---|---|
| 2,937,445 A * | 5/1960 | Erickson | ........... | A61B 1/24 433/93 |
| 3,396,468 A * | 8/1968 | Dayhoff | ........... | A61C 17/08 433/140 |
| 3,772,790 A * | 11/1973 | Swan-Gett | ........... | A61B 1/24 433/136 |
| 3,781,994 A * | 1/1974 | Hesselgren | ........... | A61C 5/82 433/137 |
| 5,011,409 A * | 4/1991 | Gray | ........... | A61C 5/82 433/136 |
| 5,078,604 A * | 1/1992 | Malmin | ........... | A61C 5/82 433/136 |
| 5,505,618 A * | 4/1996 | Summer | ........... | A61C 5/85 433/148 |
| 5,931,673 A | 8/1999 | Bolbolan | | |
| 6,213,772 B1 * | 4/2001 | Costello | ........... | A61C 17/08 433/140 |
| 6,648,642 B1 | 11/2003 | Horvath et al. | | |
| 11,234,585 B2 * | 2/2022 | Colbert | ........... | A61B 13/00 |
| 2004/0170945 A1 | 9/2004 | Heasley | | |
| 2004/0219486 A1 * | 11/2004 | Heasley | ........... | A61C 3/10 433/136 |
| 2012/0301846 A1 * | 11/2012 | Mizrahi | ........... | A61C 5/90 433/136 |
| 2019/0142550 A1 | 5/2019 | Sanders | | |
| 2022/0133437 A1 | 5/2022 | Thoreson | | |

FOREIGN PATENT DOCUMENTS

GB     2471904 A     8/2009

OTHER PUBLICATIONS

DMG MiniDam (website accessed Feb. 21, 2023).

* cited by examiner

*Primary Examiner* — Ralph A Lewis
(74) *Attorney, Agent, or Firm* — Nath, Goldberg & Meyer; Richard C. Litman

(57) ABSTRACT

A system and method for sealing and isolating an area of an intra-oral cavity using a rubber dental dam is provided. The rubber dental dam is sized to isolate and seal a partial area of the intraoral cavity, such as a lower half or an upper rear quadrant of the intraoral cavity. The rubber dental dam includes a saliva ejector port for allowing suction to remove fluids from the area.

6 Claims, 3 Drawing Sheets

MANDIBULAR QUADRIDAM

BACKGROUND

1. Field

The present disclosure relates dental dams for use during dental procedures.

2. Description of the Related Art

Dental dams are used during a multitude of dental procedures to prevent dental items and/or debris from entering a patient's oral cavity where said items could be swallowed or inhaled, leading to discomfort and potential injury. Further, dental dams are used where dental materials require dry environments in and around a tooth to achieve their optimum physical properties. Existing dental dams have several disadvantages, however.

A first disadvantage is that dental dams requires the dentist to take several time consuming steps for installing the dam properly. And, when installed, current dental dams are imposing, uncomfortable, and the patients must leave their mouths open during the entire dental procedure. Further, the current dental dams are unstable and can easily collapse. For example, the rubber membrane of a dental dam can snap off the frame and an associated securing clamp can come off the isolated tooth. This is particularly problematic in pedodontics where the patients are young children who are impatient and frightened by dental dams.

A second disadvantage is that existing dental dams require that the patient be anesthetized before the clamp can be used to hold the membrane in place around the isolated teeth. This is because the clamp exerts a great deal of pressure to the tooth, potentially causing severe pain. Administering anesthetics is time consuming and causes discomfort to the patient. A further disadvantage of clamp usage is that a clamp can cause a brittle or damaged tooth to fracture. This is common in endodontics for root canal treatment where, as a part of the procedure, the teeth are made into hollow shells without any pulp therein.

What is needed is a rubber dental which is easy to install, does not require an extraoral frame or clamps, can be installed without anesthetizing the patient, is confined to a small space in the mouth such as a quadrant, and provides a suction outlet to increase the comfort of the patient.

SUMMARY

The present subject matter satisfies these needs. In a first embodiment, the present subject matter provides an intraoral dental dam comprising a border frame enclosed within a rubber dental dam with a seal.

In an embodiment, the present subject matter relates to a mandibular quadridam including a rubber dental dam for placement of said rubber dental dam within a patient's intraoral cavity prior to commencement of a dental surgical procedure on said patient, said mandibular quadridam comprising: a border frame enclosed within said rubber dental dam defining a coverage area of the mandibular quadridam; a vertically raised portion of the mandibular quadridam traversing along an interior side of said mandibular quadridam for providing separation from an untreated area of said patient's intraoral cavity; a port for saliva ejection located in a posterior vestibule; and a maxillary extension including a contoured rubber portion that helps position said rubber dental dam in place.

In another embodiment, the present subject matter relates to a rubber dental dam for placement within a patient's intraoral cavity prior to a commencement of a dental surgical procedure, said mandibular quadridam comprising: a border frame enclosed within said rubber dental dam defining a coverage area of the mandibular quadridam; a vertically raised portion of the mandibular quadridam traversing along an interior side of said mandibular quadridam for providing separation from an untreated area of said patient's intraoral cavity; a port for saliva ejection located in a posterior vestibule; and a maxillary extension including a contoured rubber portion that helps position said rubber dental dam in place, wherein said coverage area covers an upper rear quadrant or a lower half of said intraoral cavity.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF EMBODIMENTS

Figure 1:
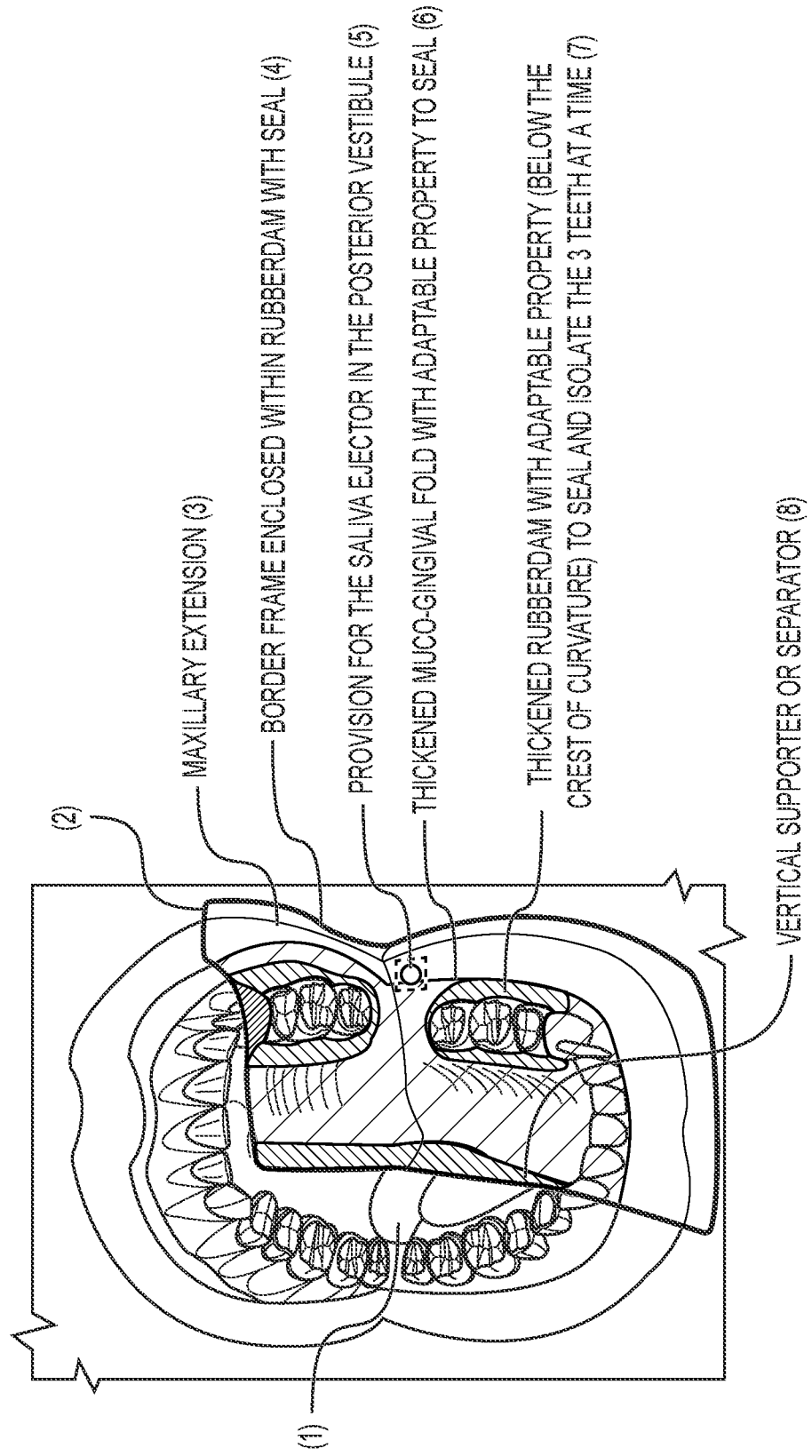
FIG. 1 is a diagram of a first embodiment of the rubber dental dam which depicts coverage over a bottom half of the lower oral cavity.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The following detailed description is merely exemplary in nature and is not intended to limit the described embodiments or the application and uses of the described embodiments. Any implementation described herein with the words "exemplary" or "illustrative" is not necessarily construed as preferred or advantageous over other implementations. All of the implementations described below are exemplary implementations provided to enable persons skilled in the art to make or use the embodiments of the disclosure and are not intended to limit the scope of the disclosure, which is defined by the claims. For the purposes of the description herein, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed therein are not to be considered as limiting, unless the claims expressly state otherwise.

In an embodiment, the present subject matter relates to a mandibular quadridam including a rubber dental dam for placement of said rubber dental dam within a patient's intraoral cavity prior to commencement of a dental surgical procedure on said patient, said mandibular quadridam comprising: a border frame enclosed within said rubber dental dam defining a coverage area of the mandibular quadridam; a vertically raised portion of the mandibular quadridam traversing along an interior side of said mandibular quadridam for providing separation from an untreated area of said patient's intraoral cavity; a port for saliva ejection located in a posterior vestibule; and a maxillary extension including a contoured rubber portion that helps position said rubber dental dam in place.

In this regard, as shown in FIG. 1, an embodiment of the present subject matter confines the operating space to a bottom half of the oral cavity where the rubber dental dam coverage area provides protection over a lower half of the oral cavity including one side of the molars and premolars on the lower set of teeth and, advantageously, the full lower set of incisors. In the rubber dental dam is a provision for a saliva ejector between the molars as shown in FIG. 1. Further, in the embodiment of FIG. 1, the rubber dental dam has sets of openings to allow for operational egress to a set of the teeth, such as three teeth, to be made available for the dental procedure. In the FIG. 1 embodiment, there are two such openings shown.

Figure 2:
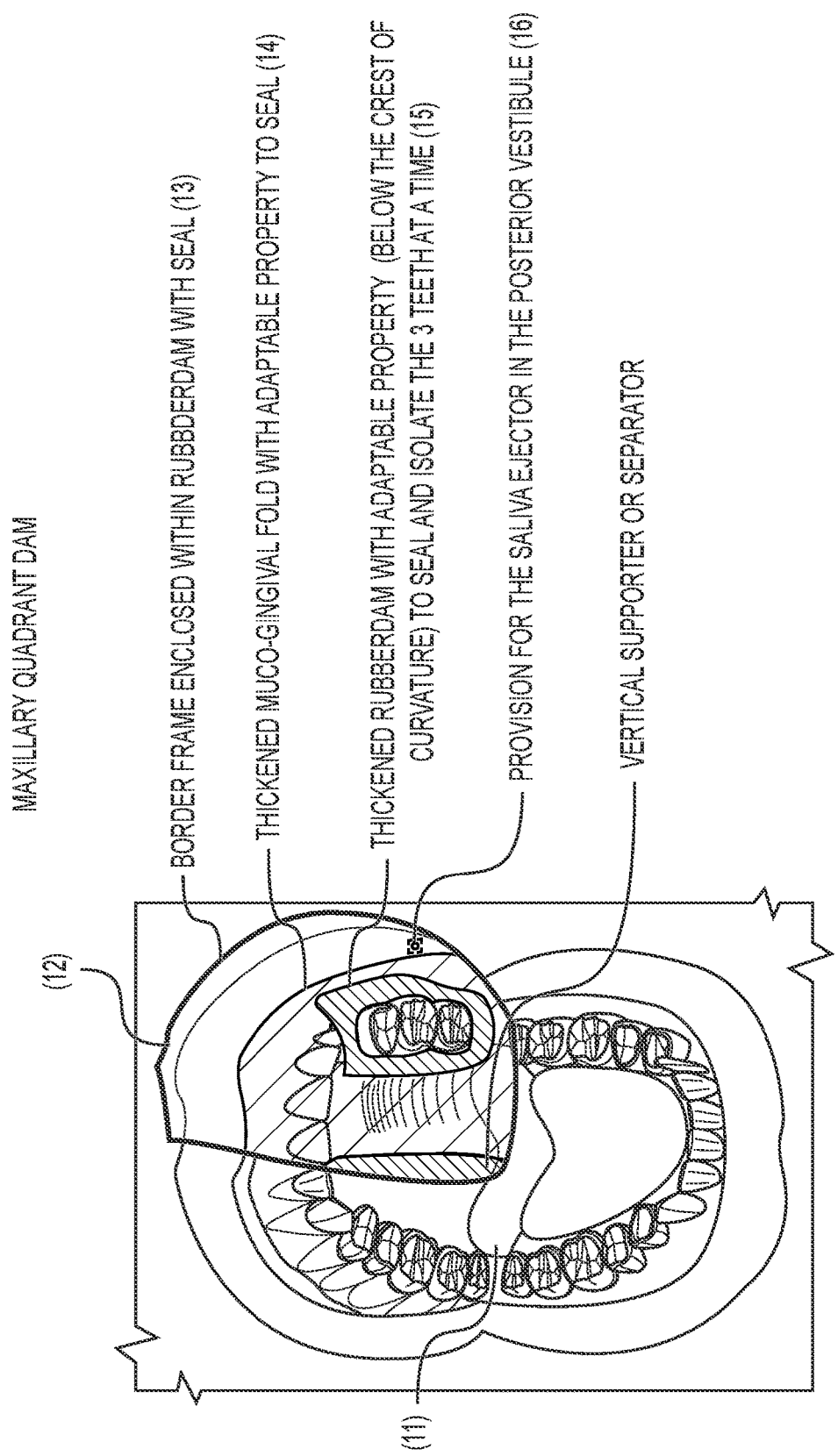
FIG. 2 is a diagram of a second embodiment of the rubber dental dam which depicts coverage over a lower rear quadrant of the lower oral cavity.
Figure 3:
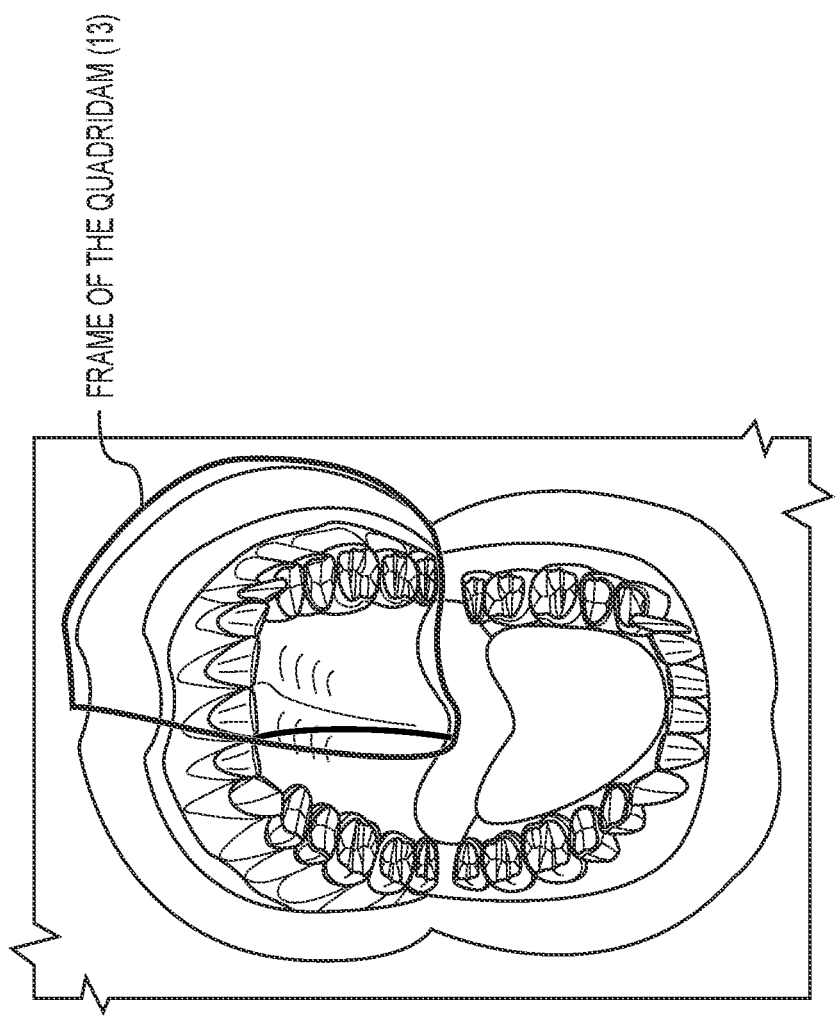
FIG. 3 is a diagram of a second embodiment of the frame of the rubber dental dam which depicts coverage over a lower rear quadrant of the lower oral cavity.

In another embodiment, the present subject matter provides an intraoral dental dam comprising a border frame enclosed within a rubber dental dam with a seal. As shown in FIGS. 2-3, this embodiment confines the operating space to a quadrant of the oral cavity where the rubber dental dam coverage area provides protection over an upper rear quadrant of the oral cavity. In the rubber dental dam is a provision for a saliva ejector in a posterior vestibule. Further, in the embodiment of FIGS. 2-3, the rubber dental dam has a set of openings that allow for an operational egress to a set of the teeth, such as three teeth, to be made available for the dental procedure.

As shown in FIG. 1, an embodiment of the present subject matter depicts an intraoral dental dam (2) comprising a border frame (4) enclosed within a rubber dental dam with a seal. The first embodiment confines the operating space to a bottom half of the oral cavity (1) where the rubber dental dam coverage area provides protection over a lower half of the oral cavity (1) including one side of the molars and premolars on the lower set of teeth and, advantageously, the full lower set of incisors. In the rubber dental dam is a provision for a saliva ejector (5) as shown in FIG. 1, which is where suction can be applied to remove excess saliva from beneath the rubber dental dam.

Further, in the embodiment of FIG. 1, the rubber dental dam has sets of openings to allow for an operational egress (7) to a set of the teeth, such as three teeth, to be made available for the dental procedure. In the FIG. 1 embodiment, there are two such openings shown. Proximal to the set of openings is a thickened portion of the rubber dental dam with adaptivity below the crest of curvature that allows the rubber dental dam to isolate and seal the teeth (7). The rubber dental dam also includes a thickened muco-gingival fold (6) with an additional adaptable property to seal the oral cavity off from the area of the dental procedure. The rubber dental dam further includes a contoured rubber portion of a maxillary extension (3) that helps position the rubber dental dam in place. Another feature of the rubber dental dam of FIG. 1 is a vertical support or separator (8) which provides a means for isolating the treatment area of the lower oral cavity half from the untreated area.

In the embodiment of FIGS. 2-3, an intraoral dental dam (12) comprises a border frame (13) enclosed within a rubber dental dam with a seal. This embodiment confines the operating space to an upper rear quadrant of the oral cavity (11) where the rubber dental dam coverage area provides protection over an upper rear quadrant of the oral cavity (11). In the rubber dental dam is a provision for a saliva ejector (16) which is where suction can be applied to remove excess saliva from beneath the rubber dental dam.

Further, in the embodiment of FIGS. 2-3, the rubber dental dam has multiple openings to allow for an operational egress (15) to a set of the teeth, such as three teeth, to be made available for a dental procedure. Proximal to the set of openings is a thickened portion of the rubber dental dam with adaptivity below the crest of curvature that allows the rubber dental dam to isolate and seal the teeth (15). The rubber dental dam also includes a thickened muco-gingival fold (14) with an additional adaptable property to seal the oral cavity off from the area of the dental procedure. Another feature of the rubber dental dam of this embodiment is a vertical support or separator (18) which provides a means for isolating the treatment area of the upper rear quadrant of the oral cavity from the untreated area. FIG. 3 shows the frame (12) of the rubber dental dam including a loop for effecting the vertical support or separation.

Since the rubber dental dam as described herein fully isolates a particular quadrant of the intraoral cavity, contamination of saliva therein is expected to be minimal or non-existent. Further, the present quadridam can be confined to one quadrant (half of the maxilla) if used for the maxillary arch. Similarly, the present quadridam can be confined to one mandibular quadrant (half of the mandible) and a part of the maxillary quadrant on the same side. This can result in the proper isolation of one or more teeth as desired, or of the desired area. Further, the design of the present quadridam permits free movement of the tongue of the patent in any free spaces. Similarly, the confinement of the present quadridam to one quadrant of the intraoral cavity allows the clinician or dentist to easily manipulate the teeth as needed, while preventing significant patient discomfort.

In an embodiment, the present quadridam can be retained along the entire attached gingiva (on both the facial/buccal or lingual/palatial surface) with an adjustable and flexible design for the firm placement and retention of the dam. The present quadridam can also use an adjustable frame (with memory) to support the entire instrument to be secured in a quadrant inside the oral cavity and also outside the same quadrant around the lips.

In another embodiment of the present subject matter, the present quadridam can comprise a thickened part of the rubber dam that normally covers three teeth and alveolar ridges of the maxillary and mandibular arch with only one hole or a hole for two adjacent teeth based on the operation site. Further, a thin sheet of the rubber dam can forms the remaining part of the quadrant (in the case of maxilla) or also include a part of maxilla (in the case of mandible).

In this regard, the present quadridam can form a border of the barrier around the tooth, with no inward slope, instead merging with the tooth surface at the gingival margin of the tooth both buccally and lingually when placed on occlusal surfaces of the adjacent teeth (the occlusal surface and the buccal and lingual/palatial surfaces above the gingival margin can be kept open). At the periphery can be a frame wire with a shape memory (embedded in the dam sheet) that can fit to cover the lips outside the oral cavity/mouth and can forms the outline of the lateral shield that separates the working quadrant area from the non-working quadrant.

While the rubber dental dam in both embodiments presented herein may be comprised of rubber, other suitable alternatives for materials can be latex or non-latex including, by way of non-limiting example, rubber, plastic, silicone, or combinations thereof. The rubber portion of the rubber dental dam is sized and shaped so it can fit within the mouth substantially adjacent to the treatment area of the teeth while allowing for substantial blockage to the oral cavity.

In an embodiment, an outlet, such as a suction outlet, can be placed at the corner of the dam, thereby connecting to a suction tube, and the outlet can be connected directly to the vestibular portion of the maxillary and mandibular arch that allows an inlet tube to contact the saliva pool, which would be sucked out.

In the embodiment of FIG. 1, the rubber dental dam is shaped such that it can rest comfortably on the palate. However, other sizes and shapes for the rubber dental dam are also possible and are contemplated herein.

The rubber dental dam can be manufactured by an injection molding process in a standard fashion. Other methods include using a computer generated shaped mold, or even using a 3-D printer to manufacture the mold.

It is to be understood that the mandibular quadridam is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A mandibular quadridam configured for placement of within a patient's intraoral cavity prior to commencement of a dental surgical procedure on said patient, said mandibular quadridam comprising:
    a flexible dental dam configured for isolating a lower half of the patient's oral cavity and configured to extend over an anterior portion and a posterior portion of the patient's mandible, said flexible dental dam further configured to extend over a portion of the patient's maxillary;
    a border frame enclosed within an outer edge of said flexible dental dam defining a coverage area of the mandibular quadridam;
    a vertically raised portion extending from said flexible dental dam and configured to traverse said patient's oral cavity between a lower portion of the patient's oral cavity and an upper portion of the patient's oral cavity, said vertically raised portion for providing separation from an untreated area of said patient's intraoral cavity;
    a port for saliva ejection located in the posterior portion of the flexible dental dam; and
    a maxillary extension including a contoured rubber portion extending from the posterior mandible portion of the flexible dental dam to the maxillary portion that helps position said flexible dental dam in place,
    wherein said border frame enclosed within said dental dam extends within said vertically raised portion providing vertical support for said vertically raised.

2. The mandibular quadridam as recited in claim 1, wherein said mandibular quadridam further includes a pair of openings in the flexible dental dam where said pair of openings provide accessibility to a collection of teeth to be treated by the dental surgical procedure by having said collection of teeth protrude through said pair of openings.

3. The mandibular quadridam as recited in claim 2, wherein the border frame enclosed within said flexible dental dam defines a coverage area of the mandibular quadridam with a seal to isolate a working area of said flexible dental dam from saliva from the patient's intra-oral cavity.

4. The mandibular quadridam as recited in claim 3, including a thickened muco-gingival fold with an adaptive property for sealing.

5. The mandibular quadridam as recited in claim 4, wherein the flexible dental dam is made from rubber, plastic, or silicone.

6. A mandibular quadridam configured for placement within a patient's intraoral cavity prior to a commencement of a dental surgical procedure on said patient, said mandibular quadridam comprising:
- a flexible dental dam for isolating a lower half of the patient's oral cavity and configured to extend over an anterior portion and a posterior portion of a patient's mandible, said flexible dental dam further configured to extend over a portion of the patient's maxillary;
- a border frame enclosed within an outer edge of said dental dam defining a coverage area of the mandibular quadridam;
- a vertically raised portion extending from said flexible dental dam and configured to traverse said patient's oral cavity between a lower portion of the patient's oral cavity and an upper portion of the patient's oral cavity, said vertically raised portion for providing separation from an untreated area of said patient's intraoral cavity;
- a port for saliva ejection located in the posterior portion of the flexible dental dam; and
- a maxillary extension including a contoured rubber portion extending from the posterior mandible portion of the flexible dental dam to the maxillary portion that helps position said flexible dental dam in place, wherein said coverage area is adapted to cover a rear part of an upper quadrant along with an entire lower quadrant on a same side of said intraoral cavity, and wherein said border frame enclosed within said dental dam extends within said vertically raised portion providing vertical support for said vertically raised portion.

* * * * *